United States Patent
Backman et al.

(10) Patent No.: US 12,278,575 B2
(45) Date of Patent: Apr. 15, 2025

(54) SYSTEM AND METHOD OF INCREASING RESOLUTION OF POSITION FEEDBACK FOR MOTOR CONTROL

(71) Applicant: Magnetek, Inc., Menomonee Falls, WI (US)

(72) Inventors: John A. Backman, Cedarburg, WI (US); Bryan Radke, West Allis, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 156 days.

(21) Appl. No.: 18/056,528

(22) Filed: Nov. 17, 2022

(65) Prior Publication Data
US 2024/0171101 A1   May 23, 2024

(51) Int. Cl.
*H02P 23/28* (2016.01)
*H02P 8/14* (2006.01)
*H02P 21/18* (2016.01)

(52) U.S. Cl.
CPC .................................. *H02P 21/18* (2016.02)

(58) Field of Classification Search
CPC .. H02M 1/008; H02M 1/0845; H02M 1/0012; H02M 3/156; H02M 3/157; H02M 1/007; H02M 3/1588; H02M 1/0009; H02M 1/40; H02M 3/01; H02M 3/015; H02M 3/33561; H02M 7/53871; H02M 1/0025;
(Continued)

(56) References Cited

U.S. PATENT DOCUMENTS 4,893,066 A   1/1990   Stewart et al.
5,455,495 A   10/1995   Bec
(Continued)

FOREIGN PATENT DOCUMENTS

CN    1734927 A    2/2006
DE    102009053876 A1    5/2011
(Continued)

OTHER PUBLICATIONS

PCT International Search Report mailed Aug. 9, 2022; International Application No. PCT/US2022/024627—(3) pages.
(Continued)

*Primary Examiner* — Kawing Chan
*Assistant Examiner* — Charles S Laughlin
(74) *Attorney, Agent, or Firm* — Boyle Fredrickson, S.C.

(57) ABSTRACT

A motor drive receives a position feedback signal from an encoder operatively connected to a motor. The motor drive executes multiple position determination modules to determine multiple approximate motor shaft positions. On each iteration of a position determination module, the motor drive samples the feedback signal, increments a pulse counter when a new encoder pulse is received, adds the pulse counter to a high-resolution pulse counter register, and calculates an approximate motor position as a function of the value of the high-resolution pulse count register. The motor drive averages the multiple approximate positions, and the result is used by a speed regulator module executed on the same motor drive to achieve the desired operation of the motor. The speed regulator iterates at a slower rate than any of the multiple position determination modules.

20 Claims, 10 Drawing Sheets

(58) Field of Classification Search
CPC .. H02M 1/32; H02M 1/4241; H02M 3/33576; H02M 7/53873; H02M 1/0043; H02M 1/0074; H02M 1/083; H02M 1/14; H02M 1/36; H02M 1/44; H02M 3/1555; H02M 3/1582; H02M 3/1584; H02M 3/33592; H02M 5/458; H02M 7/493; H02M 7/521; H02M 7/527; H02M 7/53876; H02M 7/53878; H02M 7/5395; H02M 1/009; H02M 1/10; H02M 1/42; H02M 3/33507; H02M 3/33515; H02M 5/271; H02M 5/273; H02M 5/4505; H02M 7/4803; H02M 7/49; H02M 7/525; H02M 7/53875; H02P 6/182; H02P 6/15; H02P 6/20; H02P 6/16; H02P 6/085; H02P 27/08; H02P 6/08; H02P 6/12; H02P 23/22; H02P 6/06; H02P 25/024; H02P 6/10; H02P 6/17; H02P 7/0094; H02P 23/186; H02P 25/03; H02P 6/30; H02P 23/14; H02P 29/50; H02P 5/56; H02P 23/0077; H02P 27/085; H02P 21/18; H02P 23/08; H02P 23/16; H02P 23/26; H02P 25/064; H02P 27/047; H02P 29/024; H02P 5/00; H02P 6/00; H02P 7/025; H02P 7/29; H02P 8/02; H02P 8/08; H02P 8/22; H02P 8/36; H02P 8/38; H02P 2101/45; H02P 2207/01; H02P 25/034; H02P 29/0016; H02P 6/18; H02P 6/185; H02P 8/40; H02P 9/02; H02P 21/16; H02P 21/36; H02P 2203/09; H02P 2203/11; H02P 2205/07; H02P 2207/05; H02P 23/0004; H02P 23/0018; H02P 25/22; H02P 27/04; H02P 27/045; H02P 27/048; H02P 29/02; H02P 29/028; H02P 5/485; H02P 5/50; H02P 5/52; H02P 5/68; H02P 6/32; H02P 7/00; H02P 7/05; H02P 7/18; H02P 7/2805; H02P 7/288; H02P 8/34; H02P 1/24; H02P 1/42; H02P 11/04; H02P 15/02; H02P 21/06; H02P 21/08; H02P 2101/15; H02P 2101/30; H02P 2201/03; H02P 2201/07; H02P 2201/11; H02P 2209/07; H02P 23/07; H02P 23/10; H02P 23/18; H02P 23/20; H02P 23/24; H02P 23/28; H02P 25/04; H02P 25/089; H02P 25/10; H02P 25/102; H02P 25/145; H02P 25/18; H02P 27/10; H02P 29/0022; H02P 29/032; H02P 29/40; H02P 5/46; H02P 5/74; H02P 6/006; H02P 6/04; H02P 6/14; H02P 6/187; H02P 6/21; H02P 6/22; H02P 6/26; H02P 6/28; H02P 7/03; H02P 7/2913; H02P 7/293; H02P 8/00; H02P 8/04; H02P 8/14; H02P 8/20; H02P 8/32; H02P 9/00; H02P 9/30; H02P 9/302; H02P 9/48

See application file for complete search history.

(56) References Cited

U.S. PATENT DOCUMENTS

| | | | |
|---|---|---|---|
| 6,050,368 | A | 4/2000 | Pakarinen et al. |
| 6,051,943 | A | 4/2000 | Rabin et al. |
| 6,759,973 | B2 | 7/2004 | Villaret et al. |
| 7,147,084 | B2 | 12/2006 | Jahkonen |
| 7,714,571 | B2 | 5/2010 | Pirozzi et al. |
| 9,233,815 | B2 | 1/2016 | Lee |
| 2006/0267529 | A1* | 11/2006 | Piefer .................. G05B 19/232 318/432 |
| 2008/0112697 | A1 | 5/2008 | Kim |
| 2008/0113697 | A1 | 5/2008 | Rommerdahl et al. |
| 2013/0076288 | A1* | 3/2013 | Tsuchiya ................ G05B 11/26 318/599 |
| 2016/0233813 | A1 | 8/2016 | Dalvi et al. |
| 2016/0320205 | A1 | 11/2016 | Li et al. |
| 2018/0016115 | A1 | 1/2018 | Ginsberg et al. |

FOREIGN PATENT DOCUMENTS

| | | |
|---|---|---|
| EP | 0840096 A1 | 5/1998 |
| EP | 1874669 B1 | 12/2008 |
| JP | 04-317986 A | 11/1992 |
| JP | 2018-034925 A | 3/2018 |

OTHER PUBLICATIONS

European Extended Search Report for Application No. 23207424.5 dated Apr. 23, 2024 (5 pages).

\* cited by examiner

SYSTEM AND METHOD OF INCREASING RESOLUTION OF POSITION FEEDBACK FOR MOTOR CONTROL

BACKGROUND INFORMATION

The subject matter disclosed herein relates to a system and method for increasing resolution of a position feedback signal for motor control. More specifically, a motor drive is configured to integrate a position feedback signal between counts during low speed operation to obtain increased resolution of an angular position of the motor when few counts are being received.

As is known to those skilled in the art, motor drives are commonly used to control operation of an Alternating Current (AC) motor. The motor drive is configured to convert a DC voltage, present on a DC bus within the motor drive, to an AC voltage to achieve desired operation of the motor. The AC voltage may have a varying amplitude, frequency, or combination thereof, to provide a desired speed and/or torque within the motor. The AC voltage is supplied to a stator of the motor generating a current through the stator. The current, in turn, establishes an electromagnetic field which rotates about the stator as a function of the frequency of the AC voltage being provided to the stator. The rotating electromagnetic field interacts with a magnetic field in the rotor of the motor to cause rotation of the rotor.

The electromagnetic field in the rotor may be obtained in numerous methods, depending on the type of AC motor to which the motor drive is connected. A synchronous motor may include slip rings by which a separate voltage may be provided to a winding in the rotor. The voltage provided to the winding establishes an electromagnetic field in the rotor to interact with the electromagnetic field in the stator. An induction motor includes a winding in the rotor in which a voltage is induced as a result of the rotating electromagnetic field in the stator. The induced voltage, in turn, establishes an electromagnetic field in the rotor to interact with the electromagnetic field in the stator. A permanent magnet motor includes magnets mounted on a surface of, or embedded within, the rotor of the motor. The magnetic fields generated by the permanent magnets interact with the electromagnetic field in the stator.

The windings and/or magnets in the rotor are typically provided in pairs, where each winding or magnet defines a pole of the motor and one pair of windings or one pair of magnets defines a pole-pair of the motor. A pair of windings is arranged to conduct in alternating directions in each winding, thereby generating opposing electromagnetic fields. A pair of magnets are arranged such that one magnet has a north pole and the other magnet has a south pole facing the stator winding. Multiple poles may be positioned around the rotor of the motor, where synchronous and induction motors commonly have lower pole counts, such as two, four, or six poles. Permanent magnet motors may have similar pole counts, but may also have higher pole counts, ranging up to 40-50 or even greater numbers of poles. As is understood in the art, the speed of rotation in the rotor is a function of both the frequency of the AC voltage applied to the stator and the number of poles present in the motor. As the number of poles increases, the speed of the rotor decreases. A slow speed rotor is particularly useful in a direct-drive application, where the rotor may be coupled directly to a driven member rather than requiring a gearbox positioned between the rotor of the motor and the driven member.

One application of a direct-drive permanent magnet motor is in an elevator. The rotor includes a sheave mounted on or integrally formed around the exterior of the rotor. The elevator ropes are wound over grooves on the sheave. An elevator cab is connected at one end of the ropes and a counter-weight is connected at the other end of the ropes. Rotation of the motor causes the ropes to move in the direction of the rotation which, in turn, raises and lowers the elevator cab. During operation of the elevator, it is desirable to provide a smooth ride for occupants of the cab. The motor begins motion at a slow speed and follows a smooth acceleration profile up to a top speed. As the elevator cab approaches a desired floor, the motor follows a smooth deceleration profile back down to the slow speed and finally to a stop as the elevator cab arrives at the desired floor.

Obtaining smooth operation at slow speed operation of a direct-drive permanent magnet motor is not without certain challenges. As previously indicated, desired operation of the permanent magnet motor is obtained by supplying an AC voltage to the stator to interact with the magnetic field generated by the permanent magnets. One cycle of the AC voltage, however, will interact with one pole-pair of the motor. When the pole count is low, such as a two-pole motor, a single cycle of AC voltage applied to the stator will result in a full revolution of the motor. When the pole count is high, such as with a forty-pole motor, a single electrical cycle of AC voltage applied to the stator will result in the rotor turning just one-twentieth of a revolution, or eighteen degrees. In order to achieve smooth operation of the motor, the electrical angle must be known with respect to the physical angle. To obtain knowledge of the electrical angle to one degree resolution for the afore-mentioned forty-pole motor, an encoder must generate at least seven thousand two hundred pulses per revolution (7200 ppr) or three hundred sixty degrees multiplied by twenty pole pairs. While this resolution is still marginal, some installations attempt to utilize encoders with lower resolution, such as, two thousand forty-eight pulses per revolution (2048 ppr) or four thousand ninety-six pulses per revolution (4096 ppr). With this lower resolution, the electrical angle may not be determined with sufficient resolution to provide smooth operation of the direct-drive permanent magnet motor.

Thus, it would be desirable to provide a system and method for increasing the resolution of position feedback for improved control of the motor with a low-resolution encoder.

Even when an application provides an encoder having sufficient resolution to determine the electrical angle, the direct-drive permanent magnet motor may be rotating at such a slow speed, that the feedback circuit detects few counts per periodic interval. A typical motor controller may read the number of counts received from an encoder at a two millisecond (2 ms) interval. When a direct-drive permanent magnet motor is rotating slowly (for example, when an elevator application is either approaching or leaving a floor), the number of counts detected within the two millisecond interval may be in the single digits. The two millisecond sampling interval often is not an integral multiple of the frequency at which counts are being provided from the encode. Thus, at multiples of the two millisecond interval, one sampling interval will receive one additional count when compared to a series of prior sampling intervals. If the motor is supposed to be running at a constant speed as it approaches the landing, a single count variation between cycles will be at least a ten percent (10% error) in the velocity feedback. The motor controller will respond to the sudden variation in counts with a torque perturbation that, in turn, causes vibration in the system as the motor controller attempts to maintain the same number of counts per interval.

Thus, it would be desirable to provide a system and method increasing the resolution of position and/or velocity feedback for improved control of the motor during slow speed operation.

BRIEF DESCRIPTION

The present invention provides a system and method for increasing the resolution of position and/or velocity feedback for improved control of a motor with a low-resolution encoder and for improved control during slow speed operation of a direct-drive permanent magnet motor. A motor drive receives a position feedback signal from an encoder operatively connected to the motor. The motor drive executes a speed regulator module to achieve desired operation of the motor. The speed regulator receives a speed reference signal and a speed feedback signal to determine an error in the actual motor speed from a commanded motor speed. A controller uses the speed error to output a torque or current reference used by the motor drive to adjust the operating speed of the motor to obtain the desired operating speed.

The position feedback signal may be, for example, a sinusoidal waveform having either a single waveform or a pair of waveforms in quadrature. Optionally, the position feedback signal may be digital pulses having, for example, an A channel and a B channel in quadrature. Either the encoder or the motor drive may be configured to convert the position feedback signal into counts, where a count may be generated, for example, on a positive-to-negative transition in the feedback signal, a negative-to-positive transition in the feedback signal, or on both transitions. Traditionally the motor drive would be configured to detect each count and maintain a counter with a running total of each count received and the number of counts would be used directly by the speed regulator to control operation of the motor. However, with a low-resolution encoder or during slow speed operation of a high pole count motor, the number of counts received during each iteration of the speed regulator may be less than ten. The small number of counts may result in torque vibration in the motor.

To improve the resolution of the feedback signal, the motor drive is configured to execute multiple position determination modules. The position determination modules may be stored in the motor drive's memory and executed by its processor. They may also be implemented in the motor drive's position feedback circuit. Each of the position determination modules maintains an additional counter which generates a higher resolution count than the one maintained by the traditional method described above. Like the traditional method, a first counter is maintained and updated when a pulse is detected. However, on each iteration of a position determination module, the module increments its high-resolution counter by an amount equal to the current value of the first counter. Thus, if one count has been detected, the high-resolution counters will increment by one on each iteration of the approximation routine. After a second count is detected, the high-resolution counter will begin to increment by two, and so on. Each of these high-resolution counts is used to calculate an approximate motor shaft position, which are averaged to produce a more robust approximation. This average approximate position is used by the speed regulator in place of the traditional pulse count described above. Use of the additional counter generates a higher resolution feedback signal such that, at low count rates, the time at which encoder edges occur within a cycle is used to differentiate speed feedback signals even when the number of actual encoder counts received within one cycle of the speed regulator scan is the same.

According to one embodiment of the invention, a method for increasing the resolution of a position feedback signal to a motor drive is disclosed. A position feedback signal is received at an input to the motor drive, and the motor drive executes multiple position determination modules. Each of the position determination modules samples the position feedback signal, increments a pulse counter when a new pulse from the position feedback signal is detected, adds the pulse counter to a high-resolution pulse count register, and calculates an approximate position as a function of the high-resolution pulse count register. The motor drive calculates an average approximate position by averaging the approximate positions calculated by each of the position determination modules. The motor drive also executes a speed regulator. The speed regulator periodically executes at a slower rate than any of the multiple position determination modules and uses the average approximate position.

According to other aspects of the invention, the multiple position determination modules may execute at different frequencies. The different frequencies may be selected such that no position determination module executes at a frequency that is an integer multiple of the frequency at which any other position determination module executes. Sets of multiple position determination modules may also execute at different instances in time within one of the frequencies. In one embodiment, twelve position determination modules may be executed, with four position determination modules executing at a first frequency, four position determination modules executing at a second frequency, and four position determination modules executing at a third frequency. Each set of four position determination modules executing at one of the frequencies begins execution at different, equally spaced intervals within a period of the respective frequency.

According to still other aspects of the invention, the step of executing the speed regulator may include receiving a speed reference, converting the average approximate position to a speed feedback signal, and determining a speed error as a difference between the speed reference and the speed feedback signal. The high-resolution pulse count registers may also be reset during each iteration of the speed regulator.

According to another embodiment of the invention, a motor drive configured to increase resolution of a position feedback signal is disclosed. The motor drive includes an input configured to receive the position feedback signal and a processor configured to execute multiple instances of a first series of instructions and to execute a second series of instructions. The first series of instructions increments a pulse counter when a new pulse from the position feedback signal is detected, adds the pulse counter's value to a high-resolution pulse count register, and calculates an approximate position as a function of the high-resolution pulse count register. The second series of instructions calculates an average approximate position by averaging the approximate positions calculated by each instance of the first series of instructions. The second series of instructions also executes a speed regulator that iterates at a slower rate than any instance of the first series of instructions and uses the average approximate position.

According to other aspects of this embodiment of the invention, each instance of the first series of instructions executes at a frequency which is different than the frequency for each of the other instances of the first series of instructions. The different frequencies may be selected such that no instance of the first series of instructions executes at a frequency that is an integer multiple of the frequency at which any other instance of the first series of instructions is executing. The multiple instances of the first series of instructions may also execute at different instances in time within one of the frequencies.

According to yet another embodiment of the invention, a method for increasing the resolution of a position feedback signal to a motor drive is disclosed. A position feedback signal is received at an input to the motor drive. Multiple approximate positions are calculated as functions of the position feedback signal, where each of the approximate positions is determined at one of multiple frequencies. An average approximate position is determined by averaging the multiple approximate positions, and the resulting average approximate position is used by a speed regulator executed on the motor drive.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
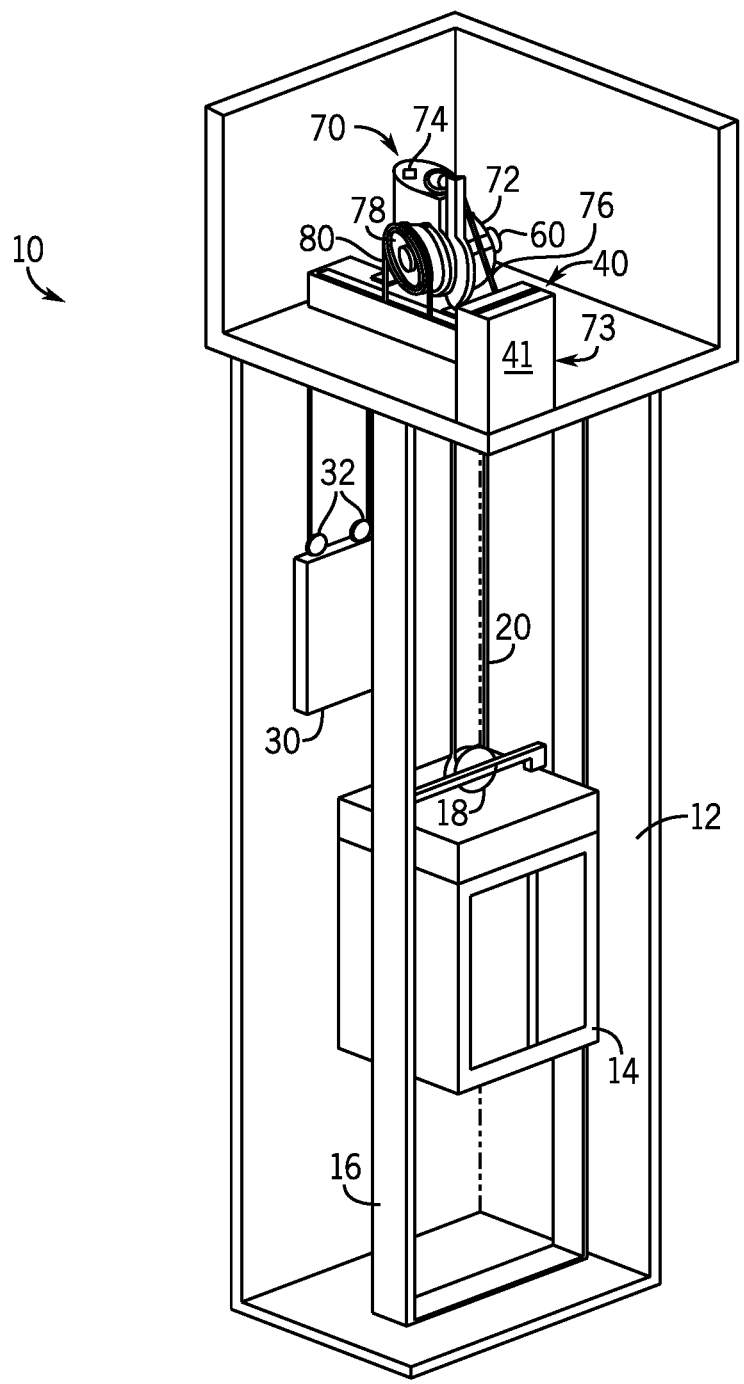
FIG. 1 is an exemplary counterbalancing system implemented by an elevator and a counterweight in which the system provides an electrical motor, a brake, an encoder and a controller for implementing a smooth brake to drive transition in accordance with an embodiment of the invention.

In describing the various embodiments of the invention which are illustrated in the drawings, specific terminology will be resorted to for the sake of clarity. However, it is not intended that the invention be limited to the specific terms so selected, and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary counterbalancing system, as shown in the exemplary elevator system 10, is provided in accordance with an embodiment of the invention. A shaft 12 includes a cab 14 configured to move up and down the shaft 12. The cab 14 includes, for example, wheels configured to engage rails 16 extending vertically along each side of the shaft 12 to maintain horizontal alignment of the cab 14 within the shaft 12. Cables 20 extending around one or more cab sheaves 18 (a grooved spindle or pulley) mounted to the top of the cab 14 may be used to raise or lower the cab 14 within the shaft 12. According to the illustrated embodiment, a first end of the cables 20 are fixedly mounted to a first point at the top of the shaft 12 and routed down and around the cab sheave 18 mounted to the top of the cab 14. The cables 20 are then routed over one or more drive sheaves 78 mounted to an electrical motor 70. The cables 20 continue around one or more counterweight sheaves 32 mounted to a counterweight 30 and back to a second point at the top of the shaft 12. It is contemplated that various other configurations of cables, sheaves, and cable routing may be utilized according to the application requirements without deviating from the scope of the invention.

According to the illustrated embodiment, the motor 70 may be mounted in a machine room located above the elevator shaft 12. Optionally, the motor 70 may be mounted in the elevator shaft 12. A brake 60, is operatively connected to the motor 70 to provide braking in the system, and an encoder 80 is operatively connected to the motor 70 to provide a feedback signal corresponding to an angular position of the motor 70. According to the illustrated embodiment, a control cabinet 41 is provided in the machine room. The control cabinet 41 may include a motor drive 40 to control operation of the motor and a separate controller 73 providing instructions to the motor drive 40. A junction box 74 may be mounted to the top of a housing 72 of the motor 70, and electrical conductors 76 may run between the control cabinet 41 and the junction box 74, the motor 70, the brake 60, and the encoder 80 to connect the motor drive 40 and the controller 73 with the motor, brake, and encoder. The electrical conductors 76 conduct electrical power and control signals to or feedback signals from the motor 70, the brake 60 and encoder 80 as will be further described.

Figure 2:
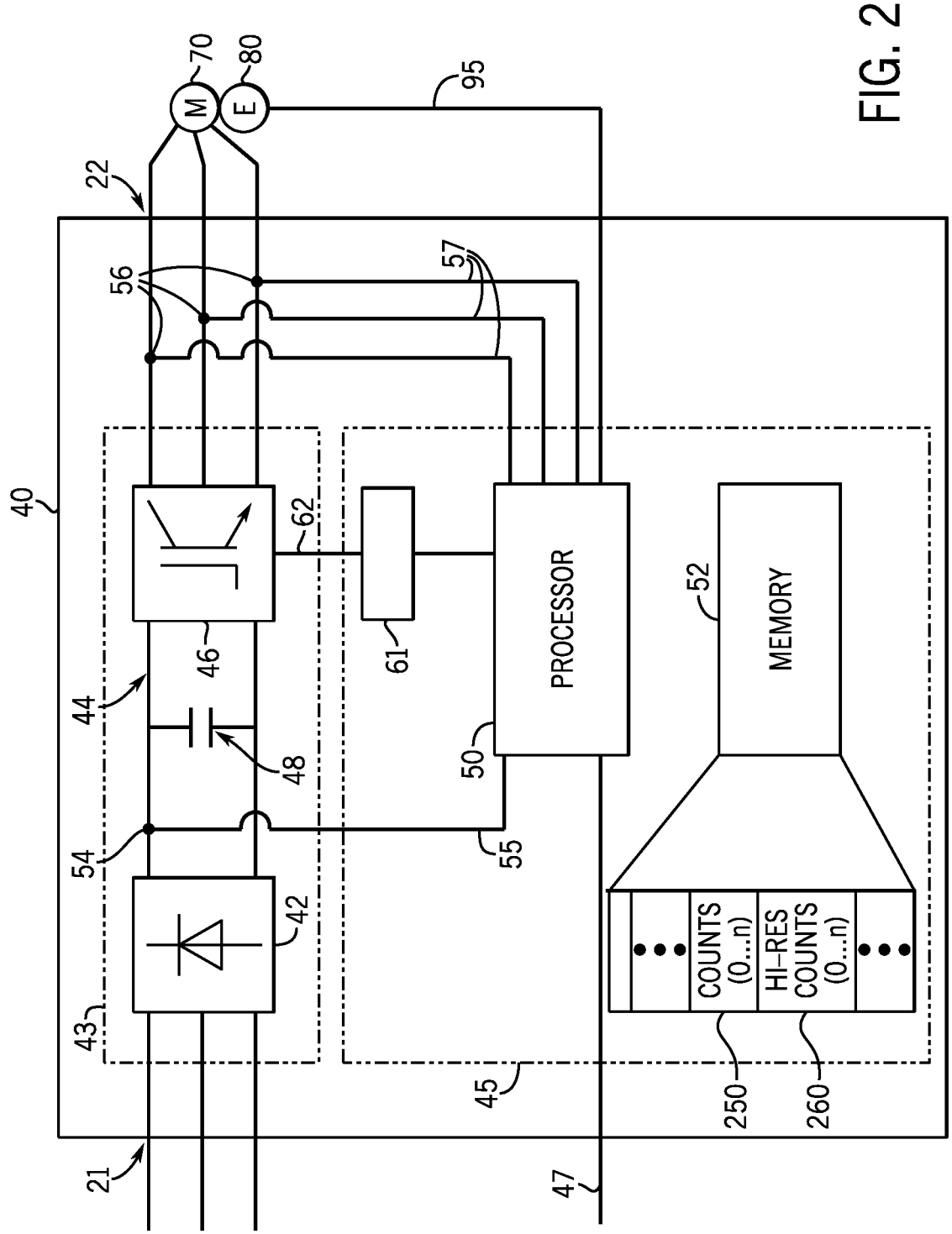
FIG. 2 is a block diagram representation of one embodiment of a motor controller and motor incorporated into the elevator system of FIG. 1.

Referring also to FIG. 2, the motor drive 40 includes a power conversion section 43 and a control section 45. The power conversion section 43 converts the input power 21 to the desired voltage at the output 22. According to the illustrated embodiment, the power conversion section 43 includes a rectifier section 42 and an inverter section 46, converting a fixed AC input 21 to a variable amplitude and variable frequency AC output 22. Optionally, other configurations of the power conversion section 43 may be included according to the application requirements. The rectifier section 42 is electrically connected to the power input 21. The rectifier section 42 may be either passive, such as a diode bridge, or active, including controlled power electronic devices such as transistors. The rectifier section 42 converts the AC voltage input 21 to a DC voltage present on a DC bus 44. The DC bus 44 may include a bus capacitance 48 connected across the DC bus 44 to smooth the level of the DC voltage present on the DC bus 44. As is known in the art, the bus capacitance 48 may include a single capacitor, or multiple capacitors, arranged in serial, parallel, or a combination thereof according to the power ratings of the motor drive 40. An inverter section 46 converts the DC voltage on the DC bus 44 to the desired voltage at the output 22 for the motor 70 according to switching signals 62.

The control section 45 receives a command signal 47 and feedback signals and generates the switching signals 62 responsive to the command and feedback signals to achieve desired operation of the motor 70. The control section 45 includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single electronic device, or multiple electronic devices, including static memory, dynamic memory, transitory memory, non-transitory memory, or a combination thereof. The memory device 52 preferably stores parameters of the motor drive 40 and one or more programs, which include instructions executable on the processor 50. A parameter table may include an identifier and a value for each of the parameters. The parameters may, for example, configure operation of the motor drive 40 or store data for later use by the motor drive 40.

A motor control module may be stored in the memory 52 for execution by the processor 50 to control operation of the motor 70. The processor 50 receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22 of the motor drive 40 respectively. The processor 50 also receives a position feedback signal 95 from the position sensor 80, such as an encoder or resolver, mounted to the motor 70. The switching signals 62 may be determined by an application specific integrated circuit 61 receiving reference signals from a processor 50 or, optionally, directly by the processor 50 executing the stored instructions. The switching signals 62 are generated, for example, as a function of the feedback signals, 55, 57, and 95, received at the processor 50.

The controller 73 in the control cabinet 41 may similarly include a processor and a memory device. It is contemplated that the processor for the controller 73 may be a single processor or multiple processors operating in tandem. It is further contemplated that the processor for the controller 73 may be implemented in part or in whole on a field programmable gate array (FPGA), an application specific integrated circuit (ASIC), a logic circuit, or a combination thereof. The memory device for the controller 73 may be a single electronic device, or multiple electronic devices, including static memory, dynamic memory, transitory memory, non-transitory memory, or a combination thereof. The memory device for the controller preferably stores parameters for operation of the elevator 10 and one or more programs, which include instructions executable on the processor for the controller 73.

Figure 3:
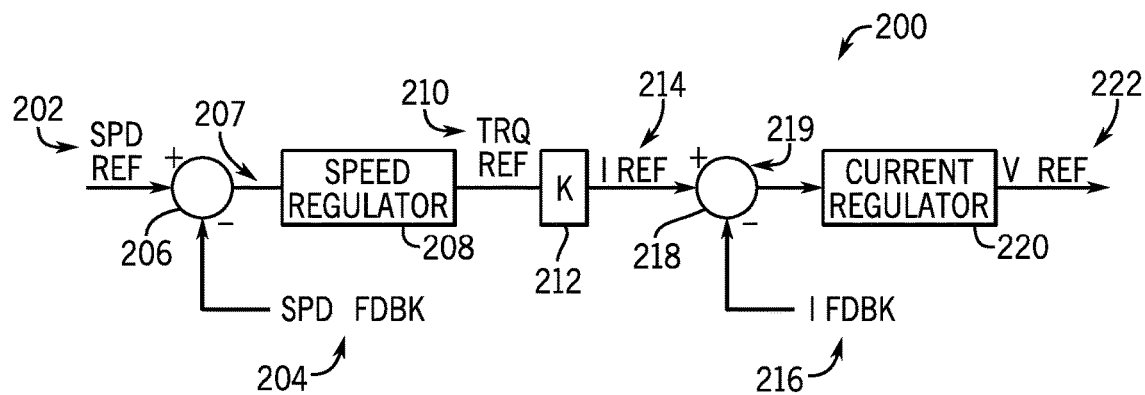
FIG. 3 is a block diagram representation of an exemplary control module executed by the motor controller of FIG. 2.

In operation, the processor 50 receives a command signal 47, indicating a desired operation of the corresponding motor 70 in the elevator system 10, and provides a variable amplitude and frequency output voltage to the motor 70 responsive to the command signal 47. The command signal 47 is received by the processor 50 and converted, for example, from discrete digital signals or an analog signal to an appropriately scaled speed reference 202 for use by a control module 200 within the motor controller 40 (see also FIG. 3). The position feedback device 80 provides the position feedback signal 95 to the processor 50. The position feedback signal 95 is converted to a speed feedback signal 204 as will be discussed in more detail below. The speed reference 202 and a speed feedback signal 204 enter a summing junction 206, resulting in a speed error signal 207. The speed error signal 207 is provided as an input to a speed regulator 208. The speed regulator 208, in turn, determines a required torque reference 210 to minimize the speed error signal 207, thereby causing the motor 70 to run at the desired speed reference 202. A scaling factor 212 converts the torque reference 210 to a desired current reference 214. The current reference 214 and a current feedback signal 216, derived from a feedback signal generated by a current sensor 136 measuring the current present at the output of the motor drive 40, enter a second summing junction 218, resulting in a current error signal 219. The current error signal is provided as an input to the current regulator 220. The current regulator 220 generates the voltage reference 222 which will minimize the error signal 219, again causing the motor 70 to run at the desired speed reference 202. This voltage reference 222 is used to generate the switching signals 62 which control the inverter section 46 to produce a variable amplitude and frequency output voltage to the motor 70.

Figure 4:
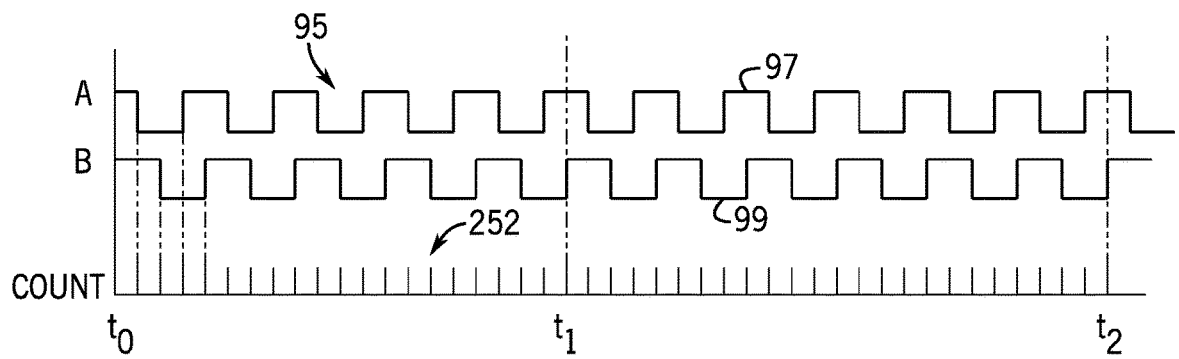
FIG. 4 is a graphical representation of an encoder feedback signal and a number of counts determined from the encoder feedback signal at a first motor speed.
Figure 5:
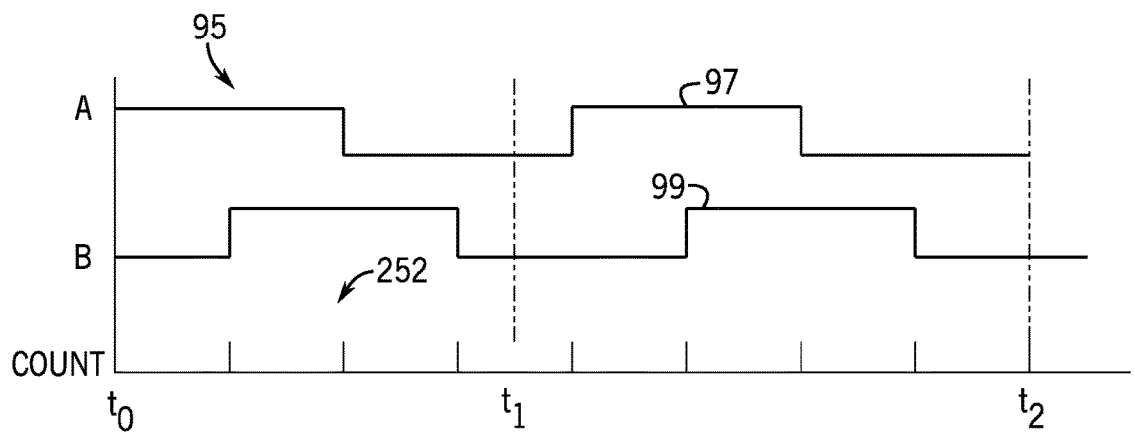
FIG. 5 is a graphical representation of an encoder feedback signal and a number of counts determined from the encoder feedback signal at a second motor speed.

With reference next to FIGS. 4 and 5, an exemplary position feedback signal 95 is illustrated. According to the illustrated embodiment, the exemplary position feedback signal 95 includes an A-channel 97 and a B-channel 99, where the B-channel is shifted in phase from the A-channel by ninety degrees. The A and B channels are commonly referred to as quadrature signals, and the direction of rotation of the motor 70 can be determined by monitoring which channel is leading the other channel. When the motor 70 is rotating in one direction, the A-channel 97 will lead the B-channel 99, and when the motor 70 is rotating in the other direction, the B-channel 99 will lead the A-channel 97. Each cycle, including a logical high segment and a logical low segment, is considered a single pulse from the position feedback device 80. As previously indicated, position feedback devices 80 are configured to generate a number of pulses per revolution of the position feedback device 80. The number of pulses per revolution (ppr) may be, for example, 1024, 2048, 4096, or the like. Because each position feedback device 80 is commonly coupled directly to the rotor of the motor 70, the number of ppr defined for the position feedback device 80 is typically the same ppr generated for each rotation of the motor 70. For purposes of discussion herein, it will be assumed that the encoder 80 is directly coupled to the rotor of the motor 70 and ppr of the encoder or ppr of the motor may be used interchangeably.

The illustrated position feedback signal 95 is intended to be exemplary only and is not limiting. It is understood that other forms of position feedback signals 95 may be utilized without deviating from the scope of the invention. The position feedback signal 95 may include, for example, differential signals, including an inverted A-channel and an inverted B-channel. Optionally, the position feedback signal 95 may include a sinusoidal waveform or a pair of sinusoidal waveforms, where one sinusoidal waveform is shifted in phase by ninety degrees from the second sinusoidal waveform. According to still another option, the position feedback signal 95 may be included as data in a data packet transmitted from the encoder via any standard or industrial protocol for data communications.

FIGS. 4 and 5 illustrate two different velocities for the motor 70. In FIG. 4, the motor generates five pulses per sample period, while in FIG. 5, the motor generates less than one pulse per sample period. Within FIGS. 4 and 5, the sample period is the duration of time between time indications along the x-axis. The duration of time between to and $t_1$ is a first sample period, and the duration of time between $t_1$ and $t_2$ is a second sample period. The duration of the sample periods illustrated in FIGS. 4 and 5 are considered to be the same. Because the rate at which the A-channel and B-channel change in FIG. 4 is faster than the rate at which they change in FIG. 5, FIG. 4 indicates the motor 70 is rotating at a faster speed to generate the illustrated position feedback signal 95 than the speed required to generate the position feedback signal 95 shown in FIG. 5.

Also illustrated in FIGS. 4 and 5 is an additional signal 252 labelled as counts. As may be observed from FIGS. 4 and 5, a count is generated at each transition from high-to-low or from low-to-high for each channel 97, 99 of the position feedback signal 95. Monitoring each edge transition allows for an initial increase in the resolution of the position feedback signal 95. As illustrated, there are four counts 252 for each pulse of the position feedback signal 95. A first count is generated at the transition from high-to-low of the A channel 97, and a second count is generated at the transition from high-to-low of the B channel 99. A third count is generated at the transition from low-to-high of the A channel 97, and a fourth count is generated at the transition from low-to-high of the B channel 99. The feedback resolution per sample period in FIG. 4 is increased from five pulses per sample period to twenty counts per sample period. The feedback resolution is also increased in FIG. 5. However, it is noted that in the first sample period, the resolution is increased from one pulse to three counts, and in the second sample period, the resolution is increased from one pulse to four counts. This results in a twenty-five percent variation in the speed feedback during consecutive sample periods. The speed regulator 208 would attempt to maintain a constant speed creating a torque ripple at the motor 70 as the speed regulator 208 repeatedly slows down and speeds up the motor.

The motor drive 40 includes a feedback circuit configured to receive the position feedback signal 95. It is contemplated that the feedback circuit may include buffers, discrete logic circuits, or even a dedicated processor to perform some initial processing on the position feedback signal 95 prior to passing the feedback signal to the processor 50. The feedback circuit may be a daughter board that is inserted into the motor drive 40 according to the type of feedback signal 95 being utilized. The feedback circuit may, for example, be configured to receive the quadrature pulses illustrated in FIG. 4, sinusoidal waveforms, or a serial communication protocol. According to one embodiment of the invention, the feedback circuit is configured to convert the position feedback signal 95 to counts 252. According to another embodiment of the invention, the processor 50 may convert the position feedback signal to counts 252.

Figure 6:
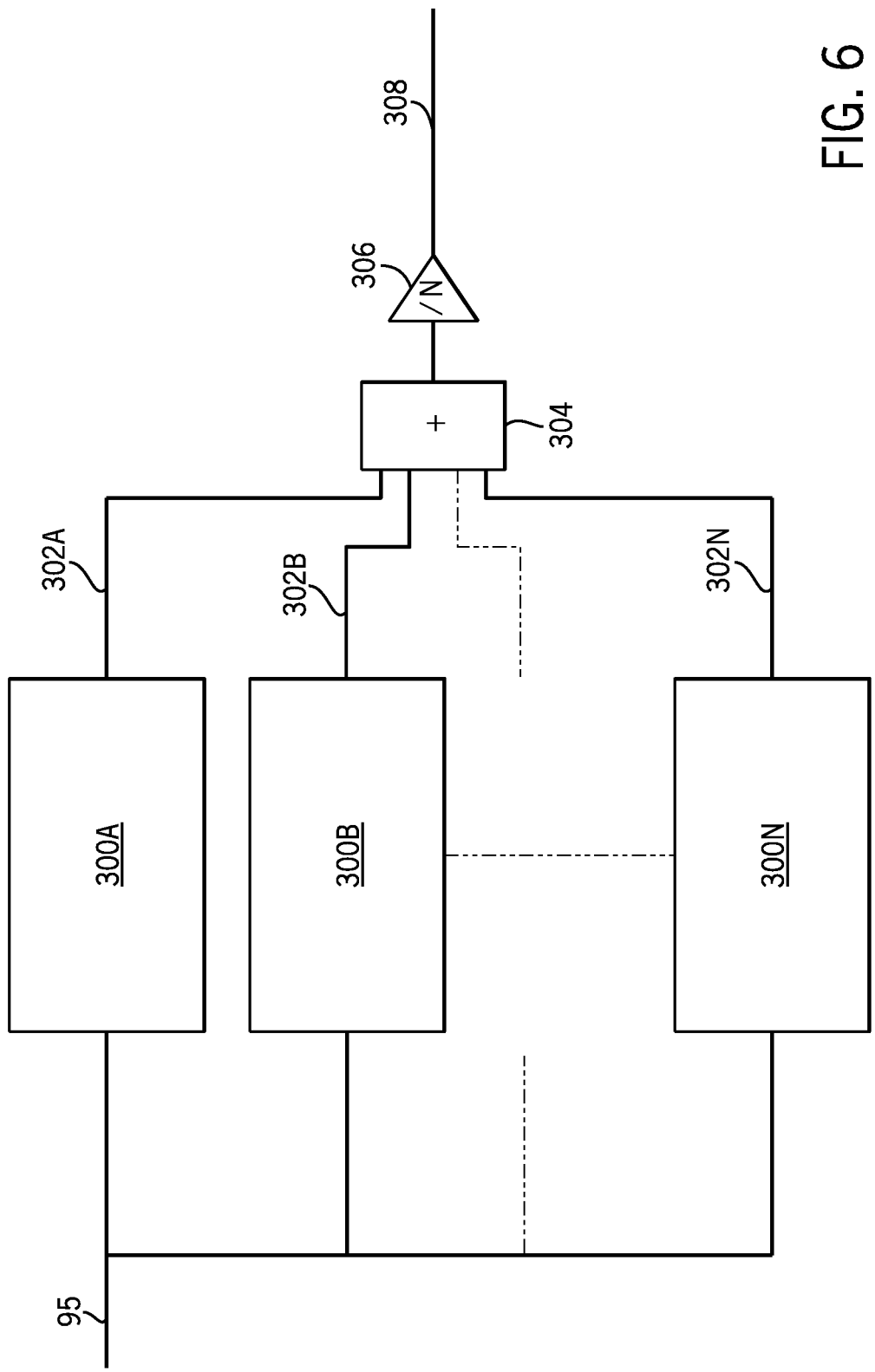
FIG. 6 is a block diagram representation of an exemplary combination of position determination modules executed by the motor controller of FIG. 2.

Turning now to FIG. 6, the present invention provides still further improvement on resolution by executing multiple position determination modules 300A-N. The position determination modules 300A-N may be stored in the motor drive's memory 52 and executed by its processor 50. Alternatively, the position determination modules 300A-N may be implemented in the motor drive's position feedback circuit. Each of the multiple position determination modules 300A-N is configured to receive and sample the position feedback signal 95 and determine an approximate motor shaft position 302 as a function of the position feedback signal. In a preferred embodiment, each position determination module 300 is configured to execute the same set of steps to determine the approximate position 302 of the motor shaft. Alternatively, one position determination module 300 or set of position determination modules may be configured to execute a different set of steps than another position determination module or set of position determination modules. Similarly, one position determination module 300 or set of position determination modules may be configured to execute at a different frequency or at a different time than another position determination module or set of position determination modules. The approximate positions 302A-N determined by each of the multiple position determination modules 300A-N are summed 304 and the result is divided 306 by the total number of position determination modules to provide an average approximate position 308. This value is used by the speed regulator 208 to control function of the motor 70.

Figure 7:
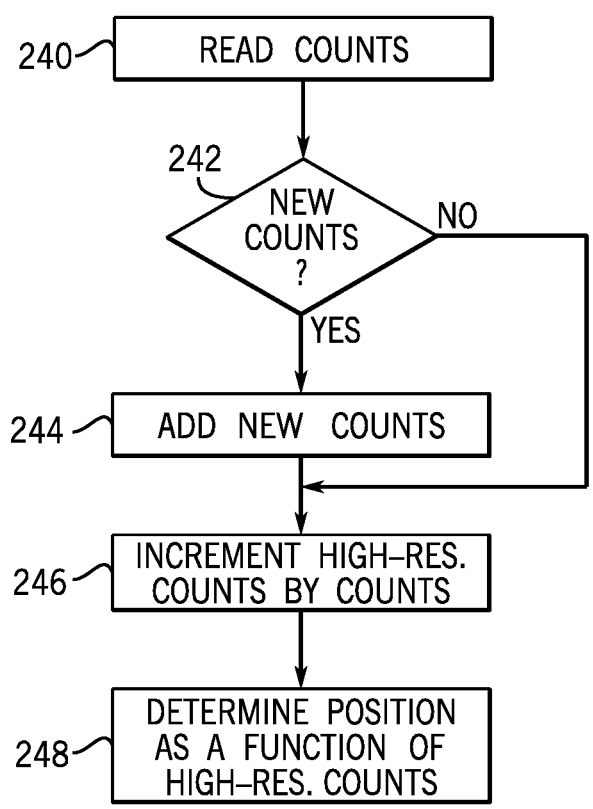
FIG. 7 is a flow diagram illustrating steps for increasing resolution of the encoder feedback signal according to one embodiment of the invention.

FIG. 7 illustrates a set of steps that may be executed by a position determination module 300. At step 240, the processor 50 reads the value of counts 250 from memory 52. The processor 50 then checks to see if new counts from the position feedback signal 95 have been detected, as illustrated in step 242. If new counts have been detected, the number of new counts detected is added to the value of counts 250 previously read from memory 52 and the new value of counts is stored in memory as shown in step 244. If no new counts were detected at step 242, the processor 50 skips down to step 246. At step 246, the processor 50 adds the value of counts 250 to the high-resolution counts register 260. Finally, at step 248, the processor 50 determines an approximate position as a function of the value in the high-resolution counter 260.

The steps illustrated in FIG. 7 are configured to execute at a faster frequency than the speed regulator 208 executes. With reference again to FIG. 3, the control module 200 includes a speed regulator 208 and a current regulator 220. The illustrated control module 200 is intended to be exemplary and not limiting and it is understood that various other control loops may be included, such as feed-forward paths, additional cascaded control loops, observers, and the like. The two illustrated regulators, however, are fundamental components and are typically configured to execute at two different rates. The speed regulator 208, as the first control loop in the cascaded control structure, executes at a slower rate than the current regulator 220, as the second control loop in the cascaded control structure. In this manner, the current regulator 220 is able to respond to changes to the current reference signal 214 and to regulate the voltage output to the motor 70 to maintain operation of the motor at the current reference. According to an exemplary embodiment, the speed regulator 208 may be configured to operate at a rate of 500 hertz (500 Hz). The current regulator 220 may be configured to operate at a user selectable rate ranging from about five kilohertz (5 kHz) to about twenty kilohertz (20 kHz). This allows the processor 50 to execute the instructions for the current regulator 220 between about ten and forty times for each time the processor executes the instructions for the speed regulator 208. Similarly, a position determination module may be configured to operate at a rate of between about ten kilohertz (10 kHz) to about twenty-five kilohertz (25 kHz). This allows the processor to execute the instruction for a position determination module between about twenty and fifty times for each time the processor executes the instructions for the speed regulator.

Figure 8A:
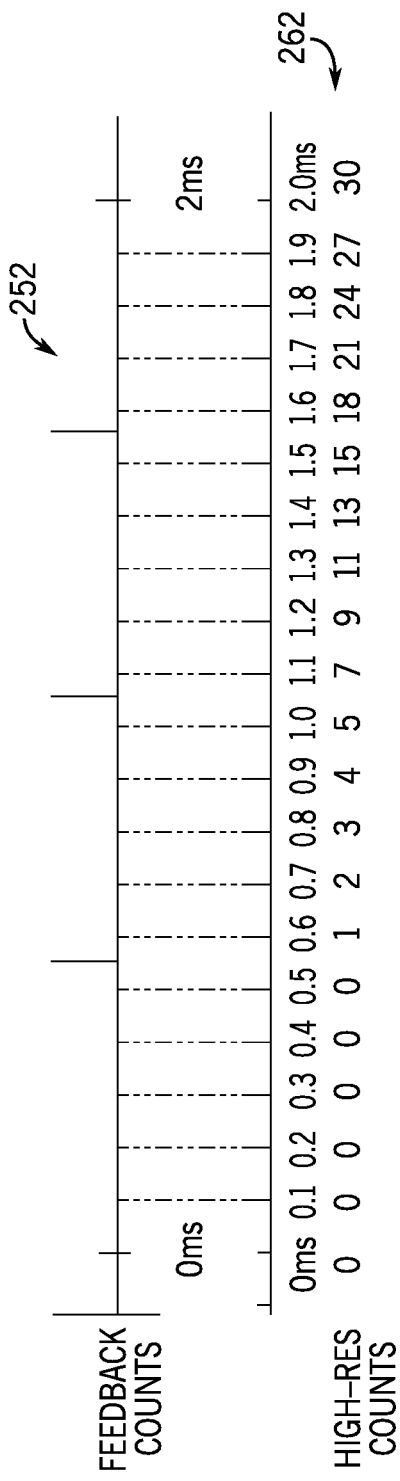
FIG. 8A is a graphical representation of converting counts to high-resolution counts at a first motor speed.
Figure 8B:
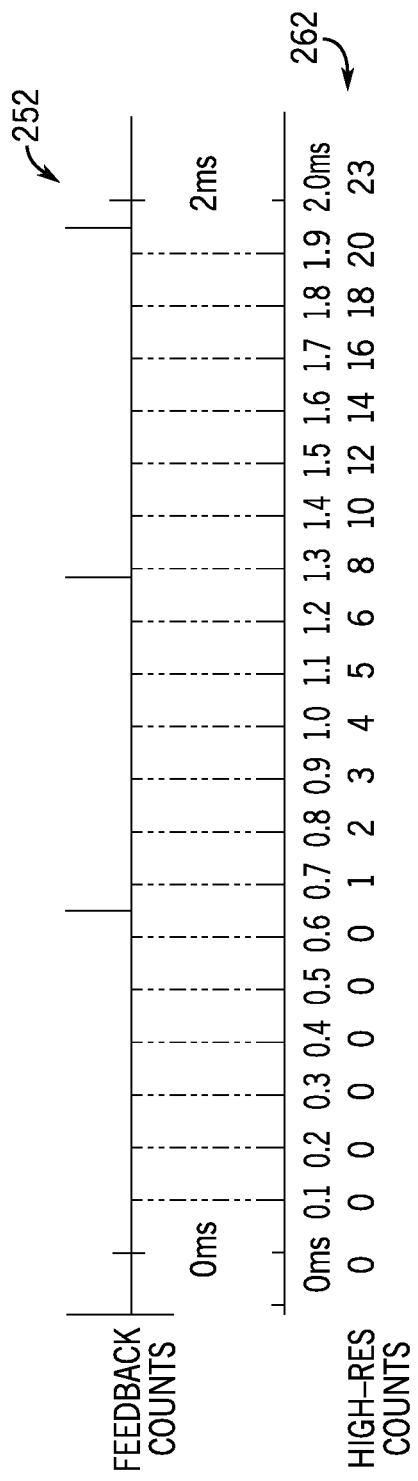
FIG. 8B is a graphical representation of converting counts to high-resolution counts at a second motor speed.

With reference next to FIGS. 8A and 8B, exemplary operation of a position determination module, executing the steps illustrated in FIG. 7, is illustrated for two different slow speed operations of the motor 70. In the illustrated embodiment, the speed regulator 208 is configured to execute at a rate of five hundred hertz (500 Hz). Thus, the speed regulator 208 executes once at the start of the time shown in each plot and will execute a second time after the 2 ms time stamp shown. The instructions for increasing resolution of the speed feedback signal 95 are performed at a rate of ten kilohertz (10 kHz) and, therefore, occur twenty times for each execution of the speed regulator.

While both FIG. 8A and FIG. 8B illustrate operation of the motor 70 at a speed for which three counts 252 are detected during the first execution of the speed regulator 208, it is evident that the motor 70 is rotating at different velocities in each figure. In FIG. 8A, the fourth count will occur almost immediately after the end of the first execution of the speed regulator 208, and in FIG. 8B, the third count occurs just before the end of the first execution of the speed regulator 208, such that the fourth count would occur at some instance into the next execution of the speed regulator 208. The values of the high-resolution counts 262 illustrate this difference in speed of the motor 70.

In FIG. 8A, the first count 252 is detected just after five hundred microseconds. For the first five iterations of the exemplary position determination module, the number of counts 252 detected is zero. Therefore, at step 244 in FIG. 7, zero is being added to the high-resolution counter 260. After detecting the first count 252, the processor 50 begins incrementing the high-resolution counter 260 by one count. The values 262 of the high-resolution counter are shown being incremented by one. The second count 252 is detected between one millisecond and one and one tenth of a millisecond, or during the tenth iteration of the exemplary position determination module 300. With the detection of a new count, the processor begins incrementing the values 262 of the high-resolution counter 260 by two. Similarly, the third count 252 is detected between one and five-tenths of a millisecond and one and six-tenths of a millisecond, or during the fifteenth iteration of the exemplary position determination module 300, and the processor begins incrementing the values 262 of the high-resolution counter 260 by three. At the end of the first execution of the speed regulator 208, the high-resolution counter 260 has thirty high-resolution counts 262.

In FIG. 8B, the first count 252 is detected just after six hundred microseconds. For the first six iterations of the exemplary position determination module, the number of counts 252 detected is zero. Therefore, at step 244 in FIG. 7, zero is being added to the high-resolution counter 260. After detecting the first count 252, the processor 50 begins incrementing the high-resolution counter 260 by one count. The values 262 of the high-resolution counter are shown being incremented by one. The second count 252 is detected between one and two-tenths of a millisecond and one and three-tenths of a millisecond, or during the twelfth iteration of the exemplary position determination module 300. With the detection of a new count, the processor begins incrementing the values 262 of the high-resolution counter 260 by two. Similarly, the third count 252 is detected between one and nine-tenths of a millisecond and two milliseconds, or during the nineteenth iteration of the exemplary position determination module 300, and the processor begins incrementing the values 262 of the high-resolution counter 260 by three. At the end of the first execution of the speed regulator 208, the high-resolution counter 260 has twenty-three high-resolution counts 262. Thus, while the number of counts 252 would indicate that the motor is operating at an identical speed, the number of high-resolution counts 262 is able to differentiate in the velocity of the motor 70 between FIG. 8A and FIG. 8B.

Figure 9A:
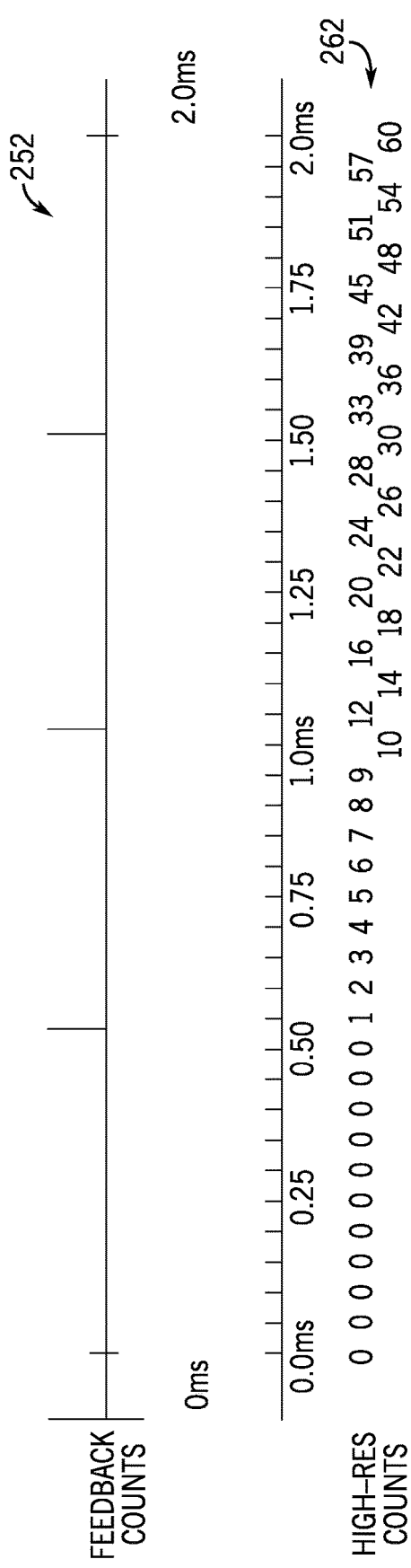
FIG. 9A is a graphical representation of converting counts to high-resolution counts at a first frequency.
Figure 9B:
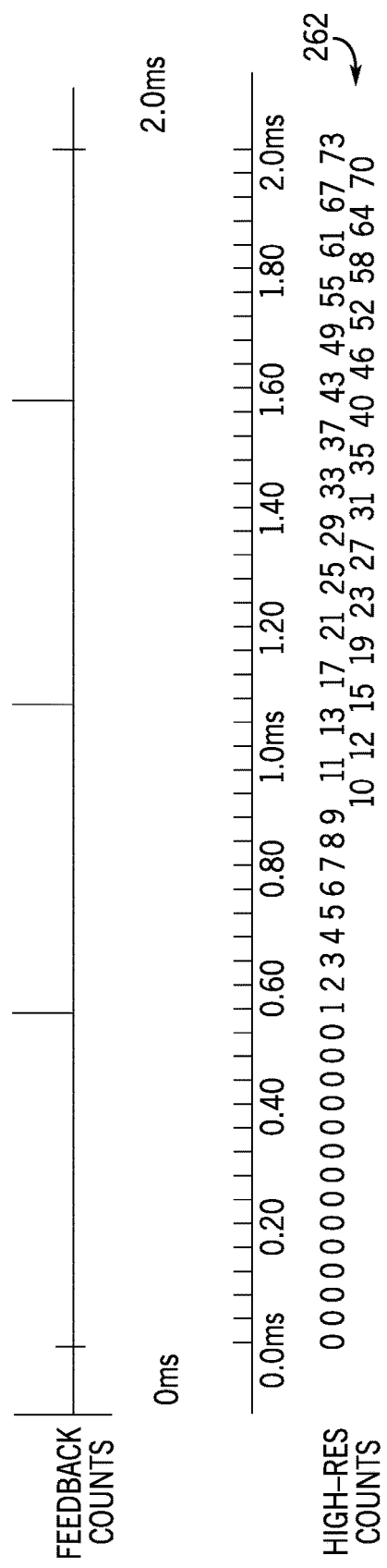
FIG. 9B is a graphical representation of converting counts to high-resolution counts at a second frequency.

While the position determination module 300 illustrated in FIGS. 8A and 8B is capable of distinguishing between different low speed motor position feedback 95 signals with the same number of counts 252 per period, the position determination module's execution rate and start time can influence its position approximation. Turning now to FIGS. 9A and 9B, the effect of execution rate on a position determination module 300, executing the steps illustrated in FIG. 7 is shown. Both illustrated position determination modules 300 are configured to receive the same position feedback signal 95, and both begin execution at the same instance in time. The position determination module 300 of FIG. 9A, however, is configured to execute at a rate of twenty kilohertz, while that of FIG. 9B is configured to execute slightly faster, at a rate of twenty-five kilohertz. Because the high-resolution counter 260 increments on every iteration of a position determination module 300 executing the steps illustrated in FIG. 7, faster execution rates will, in many cases, result in a larger high-resolution counter value. This phenomenon is clearly seen in FIGS. 9A and 9B. At the end of the illustrated period, the high-resolution counts 262 of FIG. 9A has a count value of sixty, while that of FIG. 9B has a count value of seventy-three.

Figure 10A:
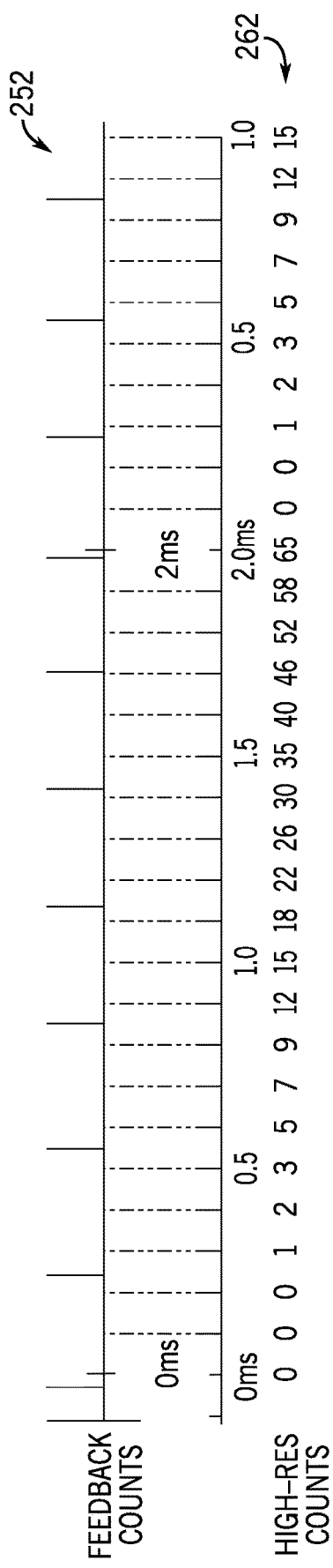
FIG. 10A is a graphical representation of converting counts to high-resolution counts at a first time.
Figure 10B:
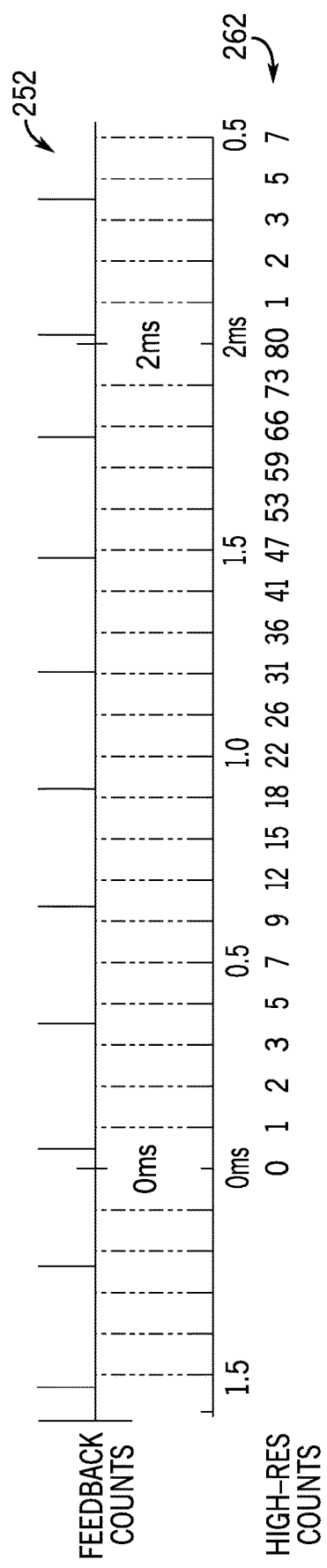
FIG. 10B is a graphical representation of converting counts to high-resolution counts at a second time.

A similar phenomenon occurs when a position determination module 300 begins executing at different instances in time relative to the position feedback signal 95 being sampled. Turning next to FIGS. 10A and 10B, two position determination modules 300 performing the steps illustrated in FIG. 7 are shown. Both are executing at the same frequency, and both are sampling the same position feedback signal 95. The position determination module 300 of FIG. 10B, however, begins executing about one half of a millisecond after that of FIG. 10A. Even though both position determination modules 300 detect seven pulses in a two-millisecond period, the slight deviation in start time results in the position determination module of FIG. 10B detecting its first pulse during its first execution period within a two millisecond window whereas the position determination module of FIG. 10A executes three times within a two millisecond window before detecting a pulse. Accordingly, the high-resolution counter 260 of FIG. 10B begins incrementing sooner within a two millisecond time interval and has a value of eighty after two milliseconds while the high-resolution counter of FIG. 10A has a value of sixty-five after the same amount of time.

To mitigate the influence that execution frequency and start time can have on the approximate position 302 determined by a position determination module 300 executing the steps illustrated in FIG. 7, it is desirable to execute several position determination modules. Furthermore, the execution frequencies and start times should be chosen such that if anomalous approximations occur, they only occur in one, or a small subset, of position determination modules 300, so that the effect of the anomalous approximations is minimized when averaged with the approximations produced by the other position determination modules.

Figure 11:
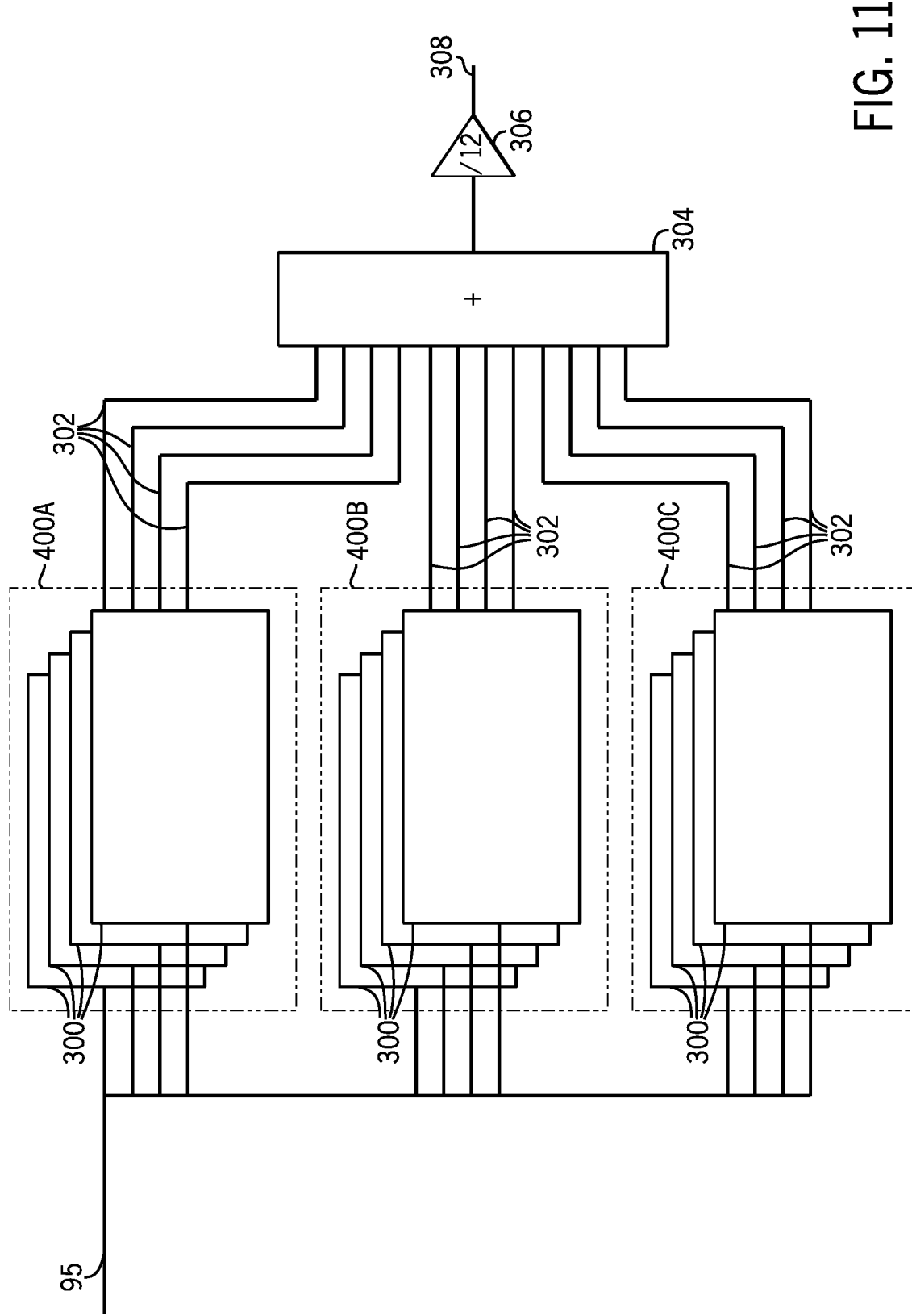
FIG. 11 is a block diagram representation of an exemplary combination of position determination modules.
Figure 12:
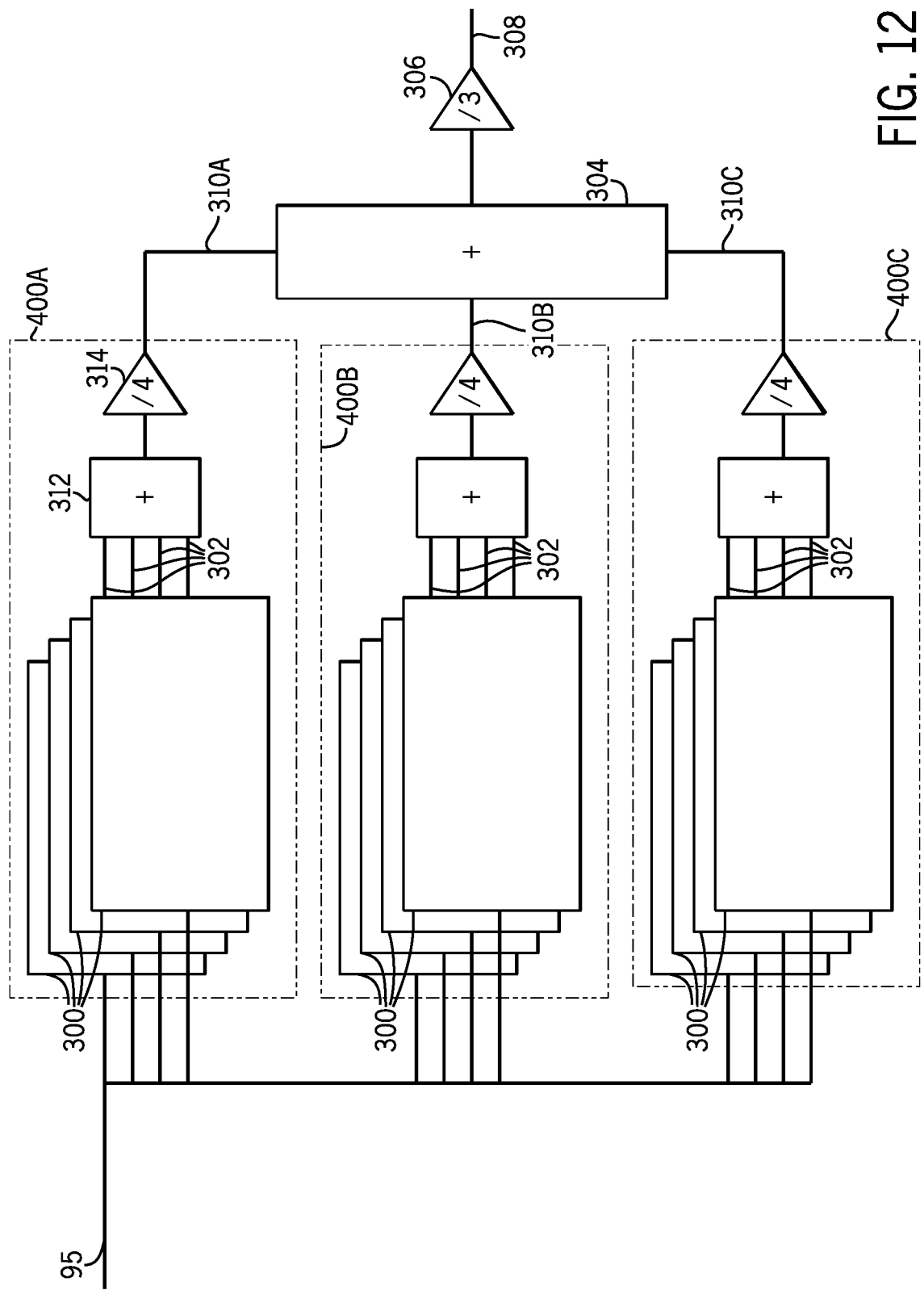
FIG. 12 is a block diagram representation of an exemplary combination of position determination modules with an alternative averaging procedure.

FIGS. 11 and 12 illustrate such an exemplary configuration. FIG. 11 illustrates three sets 400A-C of four position determination modules 300. The position determination modules 300 in each set 400 are configured to receive and sample the same position feedback signal and to execute at the same frequency, such that each position determination module 300 in one set has the same sample rate and sample period. The position determination modules 300 within each set 400 are, however, configured to start executing at different instances in time. The second position determination module 300 in one set is configured to begin execution at some time after the first position determination module within the same set begins executing. Likewise, the third position determination module in the set is configured to begin execution at some time after the second position determination module begins executing, and the fourth position determination in the set module is configured to begin execution at some time after the third position determination module begins executing. According to one aspect of the invention, each of the four position determination modules 300 within a set 400 begins execution at an equally spaced interval within one period of the frequency at which the set 400 operates. This equally spaced interval in time, therefore, would be equal to one quarter of the period in which the set 400 executes. Starting each position determination module 300 within one set 400 at a difference instance in time creates a phase shift between position determination modules within the set. This equally spaced interval for four position determination modules 300 represents a ninety degree phase shift between position determination modules. According to another aspect of the invention, each of the four position determination modules 300 within a set 400 may begin execution at staggered, but random, start intervals within one period of the frequency at which they operate. The illustrated embodiment shows four position determination modules 300 in a set 400 executing at the same frequency. The number of modules 300 within a set 400 is not intended to be limiting. It is contemplated that a set 400 may include a single position determination module 300 may, therefore, execute independently at various frequencies. Still other numbers of position determination modules 300, such as two, three, or more than four, may execute at any given frequency within a set 400 where each position determination module executing at a particular frequency starts execution at a different instance within one period of the given frequency for the set 400.

In FIGS. 11 and 12, three sets 400A-C of position determination modules 300 are illustrated. Each set 400 of the position determination modules 300 is configured to execute at a different frequency, resulting in unique high speed sample rates for each set 400 of position determination modules. As discussed above, a single position determination module 300 may be provided in each set 400, such that each position determination module executes at a different frequency. Alternately, multiple position determination modules 300 may be included in each set 400. In still another aspect of the invention each set 400 of position determination modules 300 may include a different number of position determination modules within the set. According to the illustrated embodiment in FIGS. 11 and 12, three sets 400A-C of position determination modules 300 each include four position determination modules for a total of twelve position determination modules executed by the exemplary motor drive 40. As previously mentioned, each of the three sets 400A-C of position determination modules 300 are configured to execute at different frequencies. Additionally, the correlation between position determination modules 300 is further reduced when the selected frequencies are such that none of the frequencies for one set 400 of position determination modules is an integer multiple of another set 400 of position determination modules. For example, the three frequencies for the illustrated embodiment may be fifteen kilohertz, twenty kilohertz, and twenty-five kilohertz. The first set 400A of position determination modules 300 shown in FIGS. 11 and 12 executes at fifteen kilohertz. The second set 400B of position determination modules 300 shown in FIGS. 11 and 12 executes at twenty kilohertz. The third set 400C of position determination modules 300 shown in FIGS. 11 and 12, executes at twenty-five kilohertz. Optionally, the selected frequencies may have a low order least common multiple. While this results in some correlation between sets 400 of position determination modules 300, the correlation is substantially reduced in comparison to sets 400 of position determination modules 300 executing at frequencies which are integral multiples of one another.

The average approximate position 308 is calculated by averaging the approximate positions 302 determined by all of the position determination modules 300. According to a first aspect of the invention, illustrated in FIG. 11, the approximate position 302 of each of the position determination modules 300 is summed 304 together and divided 306 by a total number of modules. According to a second aspect of the invention, illustrated in FIG. 12, each set 400 of position determination modules 300 determines a first average approximate position 310A-C by summing 312 each of the approximate positions 302 determined by each of the position determination modules executing within the set and dividing 314 the sum by the total number of position determination modules within the set. After determining an approximate position 310A-C from each set 400 of position determination modules 300, the approximate position from each set may be added 304 together and divided 306 by the number of sets to determine the average approximate position 308. It should be understood that the embodiment of the invention illustrated in FIGS. 11 and 12 is exemplary and that other quantities of position determination modules 300 or combinations of frequencies and start times may be used without deviating from the spirit of the invention.

The speed regulator 208 is then able to utilize the average approximate position to determine speed feedback 204. This speed feedback 204 signal is compared to the speed reference 202 to determine the speed error 207 as discussed above. Within the speed regulator, the processor 50 may be configured to reset the values 262 of the high-resolution counters 260 maintained by each position approximation module such that they start at zero for the following iterations of the modules.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for increasing resolution of a position feedback signal to a motor drive, the method comprising the steps of:
receiving the position feedback signal at an input to the motor drive;
executing at least two position determination modules within the motor drive, wherein each of the at least two position determination modules further executes the steps of:
sampling the position feedback signal,
incrementing a pulse counter when a new pulse from the position feedback signal is detected,
reading a high resolution pulse count register from a high resolution pulse counter,
adding the pulse counter to the high-resolution pulse count register to obtain a new value for the high resolution pulse count register,
storing the new value in the high resolution pulse count register, and
calculating an approximate position as a function of the high-resolution pulse count register;
calculating an average approximate position by averaging the approximate position calculated by each of the at least two position determination modules; and
executing a speed regulator in the motor drive, wherein:
the speed regulator periodically executes at a slower rate than each of the at least two position determination modules, and
the speed regulator uses the average approximate position.

2. The method of claim 1 wherein each of the at least two position determination modules executes at a frequency selected from a plurality of frequencies.

3. The method of claim 2 wherein the frequency for each of the at least two position determination modules is not an integer multiple of the frequency for another of the at least two position determination modules.

4. The method of claim 2 wherein each of the at least two position determination modules executes the steps of sampling, incrementing, reading, adding, storing, and calculating at a plurality of instances within a period of the frequency for the corresponding position determination module.

5. The method of claim 2 wherein:
a first set of four position determination modules execute at a first frequency,
each of the four position determination modules in the first set begin execution at an equally spaced interval within a period of the first frequency,
a second set of four position determination modules execute at a second frequency,
each of the four position determination modules in the second set begin execution at an equally spaced interval within a period of the second frequency,
a third set of four position determination modules execute at a third frequency, and
each of the four position determination modules in the third set begin execution at an equally spaced interval within a period of the third frequency.

6. The method of claim 1 wherein the step of executing the speed regulator further comprises the steps of:
receiving a speed reference;
converting the average approximate position to a speed feedback signal; and
determining a speed error as a difference between the speed reference and the speed feedback signal.

7. The method of claim 1 wherein the speed regulator further executes to reset the high-resolution pulse count register for each of the at least two position determination modules.

8. A motor drive configured to increase a resolution of a position feedback signal, the motor drive comprising:
an input configured to receive the position feedback signal; and
a processor configured to execute at least two instances of a first series of instructions and to execute a second series of instructions, wherein the first series of instructions execute to:
increment a pulse counter when a new pulse from the position feedback signal is detected,
read a high resolution count register from a high resolution counter;
add the pulse counter to the high-resolution pulse count register to obtain a new value for the high-resolution pulse count register,
store the new value in the high-resolution pulse count register, and
calculate an approximate position as a function of the high-resolution pulse count register; and
wherein the second series of instructions:
calculates an average approximate position by averaging the approximate position calculated by the at least two instances of the first series of instructions,
executes at a slower rate than any instance of the at least two instances of the first series of instructions, and
executes a speed regulator using the average approximate position.

9. The motor drive of claim 8 wherein each of the at least two instances of the first series of instructions executes at a frequency selected from a plurality of frequencies.

10. The motor drive of claim 9 wherein the frequency for each of the at least two instances of the first series of instructions is not an integer multiple of the frequency for another of the at least two instances of the first series of instructions.

11. The motor drive of claim 9 wherein the at least two instances of the first series of instructions executes at a plurality of instances within a period of the frequency for the corresponding instance of the first series of instructions.

12. The motor drive of claim 8 wherein:
a first set of four instances of the first series of instructions execute at a first frequency, each of the four instances of the first series of instructions in the first set begin execution at an equally spaced interval within the first frequency,
a second set of four instances of the first series of instructions execute at a second frequency,
each of the four instances of the first series of instructions in the second set begin execution at an equally spaced interval within the second frequency,
a third set of four instances of the first series of instructions execute at a third frequency, and
each of the four instances of the first series of instructions in the third set begin execution at an equally spaced interval within the third frequency.

13. The motor drive of claim 8 wherein the processor is further configured to execute the second series of instructions to:
   convert the average approximate position to a speed feedback signal; and
   determine a speed error as a difference between a speed reference and the speed feedback signal.

14. The motor drive of claim 8 wherein the processor is further configured to execute the second series of instructions to reset the high-resolution pulse count registers for each of the at least two instances of the first series of instructions.

15. A method for increasing resolution of a position feedback signal to a motor drive, the method comprising the steps of:
   sampling a value of a position feedback signal at a periodic interval from an input to the motor drive;
   determining a plurality of approximate positions during each of the periodic intervals, wherein each of the plurality of approximate positions is determined at one of a plurality of frequencies and as a function of the position feedback signal for the value of the position feedback signal sampled during the corresponding periodic interval, wherein each of the plurality of frequencies is greater than a frequency corresponding to the periodic interval at which the position feedback signal is sampled;
   determining an average approximate position by averaging the plurality of approximate positions at the periodic interval; and
   executing a speed regulator in the motor drive at the periodic interval, wherein the speed regulator uses the average approximate position.

16. The method of claim 15 wherein each of the plurality of frequencies is not an integer multiple of another of the plurality of frequencies.

17. The method of claim 15 wherein the approximate position at each of the plurality of frequencies is determined at a plurality of instances within a period for the corresponding frequency.

18. The method of claim 15 wherein the step of determining the plurality of approximate positions comprises sampling the position feedback signal.

19. The method of claim 15 wherein the step of determining the plurality of approximate positions comprises incrementing a pulse counter within the motor drive when a new pulse from the position feedback signal is detected.

20. The method of claim 15 wherein the step of determining the plurality of approximate positions comprises adding the pulse counter to a high-resolution pulse count register.

* * * * *